United States Patent

[11] 3,556,272

| [72] | Inventor | Geoffrey T. Jones<br>Walpole, Mass. |
|---|---|---|
| [21] | Appl. No. | 834,398 |
| [22] | Filed | June 18, 1969 |
| [45] | Patented | Jan. 19, 1971 |
| [73] | Assignee | Metal Bellows Corporation<br>Sharon, Mass. |

[54] PNEUMATIC BELLOW OPERATED CLUTCH AND BRAKE
8 Claims, 3 Drawing Figs.

[52] U.S. Cl. .................................... 192/18,
192/88, 192/91; 188/170; 92/43
[51] Int. Cl. .................................................. F16d 67/04
[50] Field of Search .......................................... 192/14,
18.1, 85C-2, 88A, 91A; 188/152.87, 170

[56] References Cited
UNITED STATES PATENTS

| 2,158,250 | 5/1939 | Peters | 192/85X |
| 2,432,272 | 12/1947 | Bariffi | 192/88X |
| 3,166,167 | 1/1965 | Kinsman | 192/18 |
| 3,378,121 | 4/1968 | Foret | 192/18 |
| 3,463,284 | 4/1969 | Kampert | 192/88 |

*Primary Examiner*—Benjamin W. Wyche
*Attorney*—Cesari McKenna

ABSTRACT: A pneumatic brake and clutch has driving and driven members rotatably mounted in a housing which is fluid tight. A friction plate is positioned opposite the driving member and connected by way of a bellows to the driven member. The plate is normally biased by the bellows into frictional engagement with the driving member so that when the driving member is rotated, the driven member rotates also.

Fluid under pressure may be introduced into the housing exteriorly of the bellows which compresses the bellows and pulls the friction plate away from the driving member so the torque is no longer coupled to the driven member. At the same time, the plate may also be pulled into engagement with a friction surface on the housing which brakes the plate and driven member to a stop.

PATENTED JAN 19 1971

3,556,272

INVENTOR
GEOFFREY T. JONES

BY

Blair Cesari & St. Onge

ATTORNEYS

PNEUMATIC BELLOW OPERATED CLUTCH AND BRAKE

BACKGROUND OF THE INVENTION

This invention relates to an improved brake and clutch. It relates more particularly to a pneumatically controlled brake and clutch employing a bellows. These devices are used in many electromechanical systems to controllably rotate various components of the system. For example, they are used in punched card sorters, automatic-packaging machines and other such apparatus.

As of late, there has been an ever increasing demand for faster, more reliable machines for performing these different functions. Implicit in this is a demand for system components such as torque couplers, brakes and clutches having fast response, ruggedness and long life. While prior brakes and clutches used for these purposes have been satisfactory with respect to one or another of the above criteria, they do not meet the very high standards desired for all of them. Thus, brakes and clutches which have a fast response tend to be rather elaborate, expensive and difficult to maintain. Indeed, many require elaborate rotary joints and seals to handle the actuating fluid.

On the other hand, those prior clutches which are relatively simple and inexpensive tend to have relatively slow response times and relatively short useful lives. Examples of this type are the various piston and solenoid brakes and clutches which are presently available. As a result, systems using these conventional rotary brakes and clutches have suffered in terms of high cost, low reliability high complexity or a relatively long down time due to wear and malfunction of components.

SUMMARY OF THE INVENTION

Accordingly, this invention aims to provide an improved brake and clutch which has a relatively fast response time.

Another object of the invention is to provide such a device which is relatively easy to make and maintain so that its manufacturing and maintenance costs are at a minimum.

Another object of the invention is to provide an improved pneumatic brake and clutch which requires no rotary joints or seals.

Yet another object of the invention is to provide a pneumatic brake and clutch which is particularly suited as a controllable torque transmitter in very fast systems, such as punched card sorters.

Another object of the invention is to provide a rotary brake and clutch which can be declutched with a minimum amount of drag.

Other objects of the invention will in part be obvious and will in part appear hereinafter.

The invention accordingly comprises the features of construction, combination of elements, and arrangement of parts which will be exemplified in the construction hereinafter set forth and the scope of the invention will be indicated in the claims.

Briefly, my pneumatic brake and clutch has a generally cylindrical housing. The driving member, which is arranged to be coupled to an input shaft, is rotatably mounted in the housing. The driven member, for coupling to an output shaft, is also rotatably mounted in the housing coaxially with the driving member. A friction plate is connected by means of a bellows to the driven member and in one embodiment is biased by the bellows toward the driving member. There is a high coefficient of friction engagement between the friction plate and the driving member so that when the driving member is rotated, torque is coupled by way of the friction plate and bellows to the driven member so that the two members rotate in unison.

A fluid passage is formed in the housing wall so that fluid under pressure can be conducted into the housing portion containing the bellows. This housing portion is otherwise fluid tight. By the term "fluid tight" is meant that fluid pressure can be developed in the housing portion sufficient to compress the bellows. In other words, in some cases, there may be a controlled fluid leakage out of the housing without interference with the operation of the device.

When fluid is introduced into the housing, the bellows is compressed, thereby drawing the friction plate away from the driving member so that the two members are no longer rotatively coupled. Also, in one embodiment, the plate is simultaneously pulled into contact with a high coefficient of friction surface on the housing so that both it and the connecting driven member brake to a stop. In addition, the width of gap 66 may be adjusted by rotating housing section 10a relative to section 10b. This feature enables one to adjust the spacing between plate 56 and annulus 68. This is done to control braking response.

The fluid which is introduced into the housing is applied as a short pulse so that the friction plate is pulled away from the driving member (and into contact with the braking surface) in a minimum amount of time so that the declutching action (and braking action) take place substantially instantaneously and with a minimum amount of drag. As a result, the angular position of the driven member can be controlled quite accurately in applications where this is of prime concern.

The subject brake and clutch is also advantaged because it requires no rotary joints or seals in its connection to the source of pressurized fluid. This not only lowers the original cost of the unit, but also minimizes secondary costs due to down time and maintenance.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 1:
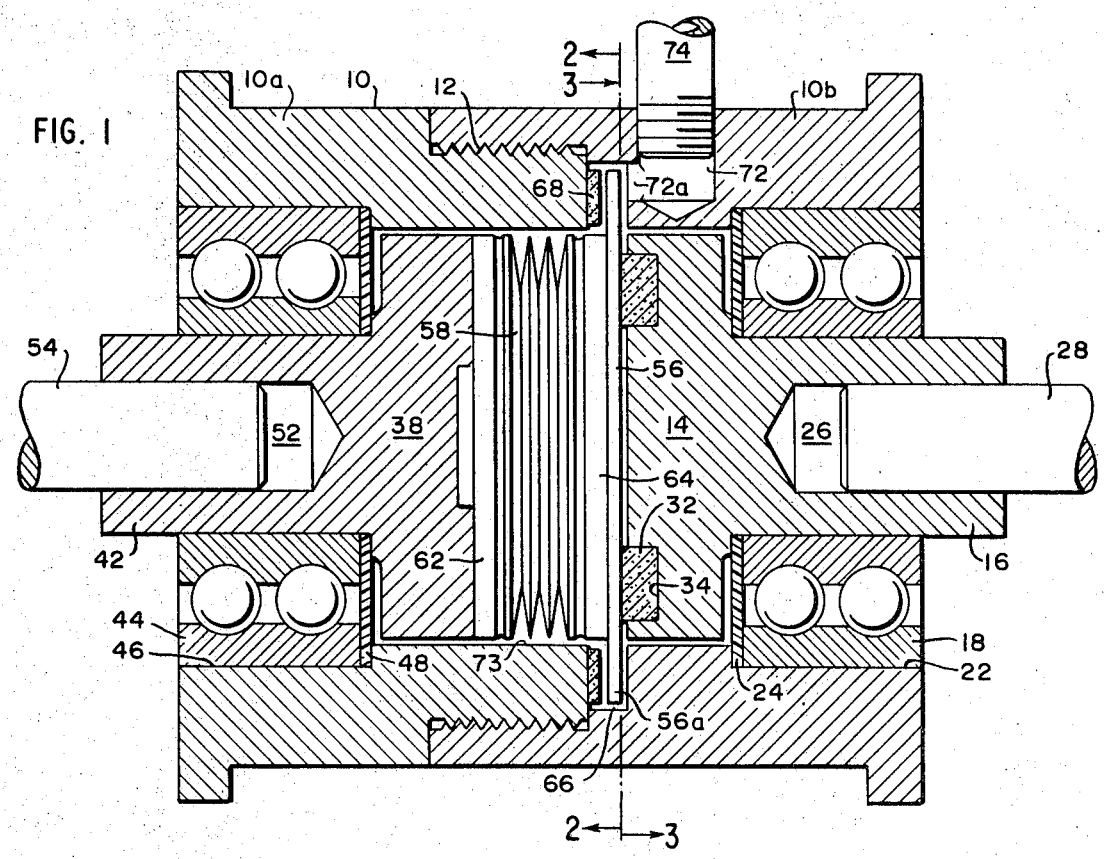
FIG. 1 is a sectional view with parts in elevation of a brake and clutch embodying the principles of my invention.

Referring now to FIG. 1, the brake and clutch comprises a generally cylindrical housing 10 formed of two separate coaxial pieces 10a and 10b which interfit end-to-end and are screwed together at 12.

A discoid driving member 14 having a coaxial stem 16 is rotatably mounted in housing 10 by means of a ball bearing unit 18 seated in a counterbore 22 in the outer end of housing section 10b. An annular gasket 24 is included at the joint with bearing unit 18 to form a fluid tight seal between unit 18 and housing section 10b at that point. Stem 16 protrudes out beyond bearing unit 18 and it has an axial bore 26 arranged to receive the end of an input shaft 28.

Figure 3:
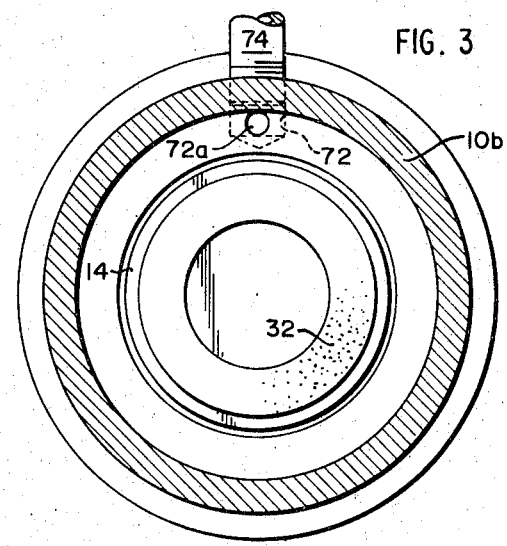
FIG. 3 is a view along line 3–3 of FIG. 1.

Also as seen in FIGS. 1 and 3, an annulus 32 of a high coefficient of friction material is seated in a circular groove 34 in the inner face of driving member 14 and it protrudes out slightly from that member.

Housing 10 also contains a driven member 38 having a coaxial stem 42. Member 38 is rotatably mounted in housing 10 by means of a ball bearing unit 44 seated in a counterbore 46 in the outer end of housing section 10a. Also, a gasket 48 is included on the inner face of bearing unit 44 to provide a fluid tight seal between unit 44 and housing section 10a. Stem 42 has an axial bore 52 which contains the end of an output shaft 54.

Figure 2:
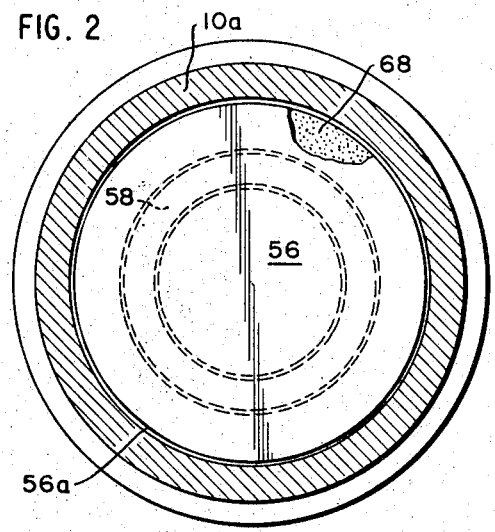
FIG. 2 is a view along line 2–2 of FIG. 1.

Turning to FIGS. 1 and 2, a circular friction plate 56 is fixed to rotate with driven member 38 by means of a flexible bellows unit 58. More particularly, one end plate 62 of the bellows unit is secured to driven member 38. The other bellows unit end plate 64 is secured to friction plate 56, with the driving member 14, driven member 38, bellows unit 58 and friction plate 56 all being arranged on a common axis.

As best seen in FIG. 1, friction plate 56 has a larger diameter than the driving and driven members, with its edge 56a extending out into an annular gap 66 formed between housing sections 10a and 10b.

In a preferred embodiment of the invention, an annulus 68 made of a high coefficient of friction material is secured to the inner end of housing section 10a in gap 66 directly opposite the edge portion 56a of plate 56. Annulus 68 acts as a braking surface, as will bed be described in more detail later.

Referring to FIGS. 1 and 3, a radial passage 72 is formed in the sidewall of housing section 10b. A longitudinal passage extension 72a extends from passage 72 proper to the gap 66, thence to the housing cavity 73 containing bellows unit 58. A pipe 74 connected to a source of fluid under pressure extends into passage 72 so that the fluid can be conducted into the housing cavity 73.

In the illustrated embodiment of the invention, plate 56 is normally biased toward driving member 14 because of the spring rate of bellows unit 58. Normally, then, plate 56 frictionally engages annulus 32, but is spaced slightly from annulus 68. In this condition, when input shaft 28 is rotated, plate 56 tends to rotate with annulus 32 and driving member 14 so that the input torque is coupled by way of plate 56 and bellows unit 58 to driven member 38 and its output shaft 54. Thus, normally the shafts 28 and 54 tend to rotate in unison with a minimum amount of slippage.

However, when fluid under pressure is introduced into gap 66 and cavity 73 by way of pipe 74, bellows unit 58 is compressed and plate 56 is moved to the left in FIG. 1, away from annulus 32. Accordingly, plate 56 no longer rotates with driving member 14. Also, the plate is pulled into frictional engagement with annulus 68. Therefore, it is brought to a stop. Since plate 56 is rotatably fixed to driven member 38 by means of bellows unit 58, driven member 38 and its output shaft 54 also stop rotating.

The pressurized fluid is introduced into the unit in the form of a pulse so that plate 56 is disengaged from annulus 32 and brought into engagement with annulus 68 substantially instantaneously so that annulus 32 exerts a minimum amount of drag on the plate and the plate is brought to an abrupt stop. In other words, the unit responds very quickly so that there is minimum rotation of output shaft 54 following the declutching pulse. Such fast response is critical in apparatus such as card sorters, which must react very quickly to different inputs.

When the fluid is released from cavity 73 and gap 66 by venting pipe 74, bellows unit 58 immediately biases pipe 56 out of engagement with annulus 68 and into engagement with annulus 32 so the input and output shafts 28 and 54 are again rotatively coupled.

It is important to note at this point that the coupling characteristics of the illustrated unit depend primarily on the bellows unit 58 spring rate, and the coefficient of friction of annulus 32 rather than on fluid pressure. Therefore, the clutching action of the unit can be made as easy or abrupt as desired. More importantly, however, for the same reasons, the torque transmitted to the output shaft 54 is independent of fluid pressure.

It should be noted also that the actuating fluid is introduced into housing 10 which remains stationary. Therefore, the unit does not require any expensive rotary joints and seals which require maintenance and replacement. And otherwise, it is composed of a relatively few inexpensive, rugged parts. In addition, the unit can be disassembled very quickly simply by unscrewing housing sections 10a and 10b should there ever be a need to repair or replace any of the internal components. For there reasons, maintenance costs are down time of the unit are kept to a minimum.

The illustrated unit is both a clutch and a brake. It is obvious, however, that it can be a free running clutch simply by omitting annulus 68. In this event, application of a fluid pulse pulls plate 56 away from annulus 32 so that the plate and the output shaft 54 to which the plate is coupled rotate independently of driving member 14 and its input shaft 28.

It can be seen from the foregoing that various changes may be made in the above unit without departing from the scope of the invention. For example, bellows unit 58 can have a negative spring rate so that plate 56 is normally disengaged from annulus 32 and the shafts are normally uncoupled. Then, by applying a negative pressure to pipe 74 and drawing a vacuum in cavity 73, bellows unit 58 can be made to expand in opposition to the bias provided by the bellows unit until plate 56 frictionally engages annulus 32 and couples together the input and output shafts.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:

1. An improved pneumatic clutch comprising:
   A. a housing;
   B. a driving member;
   C. a driven member, said driving and driven members being rotatably mounted in the housing along a common axis;
   D. means for sealing the ends of the housing so as to define a fluid tight cavity therein;
   E. bellows;
      1. positioned in the cavity; and
      2. having one end secured to one of the driving and driven members;
   F. a friction plate;
      1. secured to the other end of the bellows; and
      2. arranged opposite the other of the driving and driven members;
   G. means for controlling the pressure in the housing cavity so that the bellows urges the plate into frictional engagement with the other of the members so that the two members rotate in unison; and
   H. means for changing the pressure in the housing cavity so that the bellows is compressed, thereby pulling the friction plate away from the other of the members so that the two members rotate independently.

2. An improved pneumatic clutch defined in claim 1 wherein the bellows has a spring rate which biases the plate toward the other of said members.

3. An improved pneumatic clutch as defined in claim 1 and further including a braking surface on a wall portion of the housing at the side of the plate adjacent the bellows, the plate being arranged to frictionally engage the braking surface when the plate is biased away from the other of said members so that the one member cannot rotate.

4. An improved pneumatic clutch comprising:
   A. a housing;
   B. a driving member rotatably mounted in the housing;
   C. a driven member rotatably mounted in the housing coaxially with the driving member;
   D. means for sealing the ends of the housing so as to form a fluid tight cavity therein which contains at least portions of the driving and driven members;
   E. a bellows;
      1. positioned in the housing cavity coaxially with the driving and driven members; and
      2. having one end secured to one of said member portions;
   F. a friction plate;
      1. secured to the other end of the bellows; and
      2. urged by the bellows into frictional engagement with the other of said member portions so that when the other of said member portions so that when driving member is rotated, torque is coupled by way of the plate and bellows to the driven member; and
   G. a fluid passage in the sidewall of the housing for conducting fluid under pressure into the cavity which compresses the bellows, thereby retracting the plate from its frictional engagement with the other of said member portions so that the two members rotate independently.

5. An improved pneumatic clutch as defined in claim 4 wherein said housing comprises a pair of separate, generally cylindrical sections which can be screwed apart to gain access to the parts therein and for adjustment.

6. An improved pneumatic clutch as defined in claim 4 and further including means forming a high coefficient of friction interface between the plate and the other of said members.

7. An improved pneumatic clutch as defined in claim 6 and further including a high coefficient of friction surface on a portion of the housing adjacent the bellows and facing the plate, said surface being arranged so that when the plate is pulled out of frictional engagement with the other of said member portions it frictionally engages the surface whereby the plate, bellows and said one of said members are prevented from rotating.

8. An improved pneumatic brake comprising; comprising:
A. a housing;
B. a member rotatably mounted in the housing;
C. means for sealing the housing so as to define a fluid type cavity therein containing the member;
D. a bellows;
 1. positioned in the cavity; and
 2. having one end secured to the member;
E. a friction plate;
 1. secured to the other end of the bellows; and
 2. arranged opposite a surface affixed to the housing;
F. means for controlling the pressure in the housing cavity so that the bellows contracts and pulls the plate into frictional engagement with the surface whereby said member is prevented from rotating; and
G. means for changing the pressure in the housing cavity so that the bellows expands and the plate no longer frictionally engages the surface whereby the member is free to rotate.